United States Patent [19]
Boltz et al.

[11] Patent Number: 6,097,963
[45] Date of Patent: Aug. 1, 2000

[54] METHOD OF PROVIDING A MULTIPLE MOBILE SUBSCRIBER ACCESS GROUP IN A RADIO TELECOMMUNICATIONS NETWORK

[75] Inventors: David Boltz; Bret Westbrook, both of Garland, Tex.

[73] Assignee: Ericsson Inc., Richardson, Tex.

[21] Appl. No.: 08/972,779

[22] Filed: Nov. 18, 1997

[51] Int. Cl.[7] ............................... H04B 7/00; H04Q 7/20
[52] U.S. Cl. ........................ 455/518; 455/445; 455/433
[58] Field of Search .................................. 455/432, 433, 455/416, 560, 518, 519, 551, 463, 462, 445

[56] References Cited

U.S. PATENT DOCUMENTS

| | | | |
|---|---|---|---|
| 5,260,986 | 11/1993 | Pershan | 455/413 |
| 5,425,030 | 6/1995 | Comroe et al. | 370/336 |
| 5,467,381 | 11/1995 | Peltonen et al. | 455/432 |
| 5,506,890 | 4/1996 | Gupta et al. | 379/88.25 |
| 5,699,407 | 12/1997 | Nguyen | 455/462 |
| 5,711,011 | 1/1998 | Urs et al. | 455/520 |
| 5,787,343 | 7/1998 | Iijima et al. | 455/414 |
| 5,797,100 | 8/1998 | Dettner | 455/518 |
| 5,809,018 | 9/1998 | Lehmusto | 370/330 |
| 5,835,860 | 11/1998 | Diachina | 455/458 |
| 5,839,072 | 11/1998 | Chien | 455/445 |
| 5,890,064 | 3/1999 | Widergen et al. | 455/445 |
| 5,920,820 | 7/1999 | Qureshi et al. | 455/461 |
| 5,953,673 | 9/1999 | Neubauer et al. | 455/518 |
| 5,966,432 | 10/1999 | Buckler et al. | 379/167 |

FOREIGN PATENT DOCUMENTS

| | | |
|---|---|---|
| WO92/10069 | 6/1992 | WIPO . |
| WO 95/35001 | 12/1995 | WIPO . |
| WO 98/24252 | 6/1998 | WIPO . |
| WO 98/26626 | 6/1998 | WIPO . |

*Primary Examiner*—Nguyen Vo
*Assistant Examiner*—Charles N. Appiah
*Attorney, Agent, or Firm*—Smith & Danamraj, PC

[57] ABSTRACT

A method in a radio telecommunications network of connecting an incoming call to a called subscriber in a Multiple Mobile Subscriber Access Group (MMSAG) which includes a plurality of mobile subscribers. The incoming call, which includes a group identification number for the MMSAG, is received in a Gateway Mobile Switching Center (G-MSC). A request for routing information is sent to a Home Location Register (HLR) where a group data record associated with the group identification number is accessed. The group data record includes a list of individual mobile subscriber numbers allocated to the mobile subscribers in the MMSAG. This is followed by selecting a first one of the individual mobile subscriber numbers to receive the call, determining whether a first mobile subscriber associated with the first selected individual mobile subscriber number is available to receive the call, and completing the call to the first mobile subscriber associated with the first selected individual mobile subscriber number if the first mobile subscriber is available to receive the call. If not, service logic in the HLR selects another individual mobile subscriber numbers to receive the call. If none of the mobile subscribers are available, the call is forwarded to a voice mail machine.

8 Claims, 4 Drawing Sheets

METHOD OF PROVIDING A MULTIPLE MOBILE SUBSCRIBER ACCESS GROUP IN A RADIO TELECOMMUNICATIONS NETWORK

BACKGROUND OF THE INVENTION

1. Technical Field of the Invention

This invention relates to radio telecommunication systems and, more particularly, to a method of providing a Multiple Mobile Subscriber Access Group (MMSAG) in a radio telecommunications network.

2. Description of Related Art

In existing radio telecommunications networks utilizing the Global System for Mobile Communications (GSM), a unique mobile directory number called the Mobile Subscriber Integrated Services Digital Network (MSISDN) number is allocated to each mobile subscriber. To reach a particular subscriber, the subscriber's MSISDN must be dialed by the calling party. This limitation is a disadvantage in situations where the calling party desires to reach any one of a group of mobile subscribers. For example, when a potential passenger desires to call a mobile-equipped taxi cab, the potential passenger must dial the main number to the taxi cab company, and then the taxi company must call one of its mobile-equipped cabs. A dispatch person must call the cabs one at a time until one of them answers. This is a process which is labor-intensive for the taxi cab company since the dispatch person must receive the incoming calls from passengers and place calls to individual cabs in order to respond to the passenger's request. In addition, it is a process which is error-prone since the dispatch person at the cab company is often very busy, and can make mistakes or forget to dispatch a cab in response to the potential passenger's request. This results in a loss of revenue for the cab company and is an inconvenience for the potential passenger who has to find another cab.

There are no known prior art teachings of a solution to the aforementioned deficiency and shortcoming such as that disclosed herein.

In order to overcome the disadvantage of existing GSM networks, it would be advantageous to have a method by which a calling party can dial a single telephone number and be connected to one of a group of called mobile subscribers. The present invention provides such a method.

SUMMARY OF THE INVENTION

In one aspect, the present invention is a method in a radio telecommunications network of connecting an incoming call to a called subscriber in a Multiple Mobile Subscriber Access Group (MMSAG) which includes a plurality of mobile subscribers. The method includes the steps of receiving in the network, the incoming call which includes a group identification number for the MMSAG, and accessing a group data record associated with the group identification number. The group data record includes a list of individual mobile subscriber numbers allocated to the mobile subscribers in the MMSAG. This is followed by selecting a first one of the individual mobile subscriber numbers to receive the call, determining whether a first mobile subscriber associated with the first selected individual mobile subscriber number is available to receive the call, and completing the call to the first mobile subscriber associated with the first selected individual mobile subscriber number upon determining that the first mobile subscriber is available to receive the call.

The method may also include the steps of selecting a next one of the individual mobile subscriber numbers to receive the call upon determining that the first mobile subscriber is not available to receive the call, determining whether a next mobile subscriber associated with the next selected individual mobile subscriber number is available to receive the call, and completing the call to the next mobile subscriber associated with the next selected individual mobile subscriber number upon determining that the next mobile subscriber is available to receive the call.

In another aspect, the present invention is a home location register (HLR) in a radio telecommunications network. The HLR includes two data structures. A first data structure comprises at least one group data record for a plurality of mobile subscribers which are allocated individual subscriber identification numbers and are assigned to an access group, and a second data structure linked to the first data structure comprises a plurality of individual mobile subscriber records. The group data record is identified by a group identification number, and includes a list of the individual subscriber identification numbers allocated to the plurality of mobile subscribers assigned to the access group, and also includes service logic for selecting one of the individual subscriber identification numbers to receive an incoming call to the group identification number. The individual mobile subscriber records in the second data structure are each identified by one of the individual subscriber identification numbers in the group data record list, and are each associated with a mobile subscriber. Each individual mobile subscriber record includes mobile subscriber data for the associated mobile subscriber, and an identification of a serving Mobile Switching Center (MSC) currently serving the associated mobile subscriber.

In yet another aspect, the present invention is a method of implementing, in a home location register (HLR), a database associated with a plurality of mobile subscribers assigned to a Multiple Mobile Subscriber Access Group (MMSAG) in a radio telecommunications network. The method includes the steps of allocating individual subscriber identification numbers to each of the plurality of mobile subscribers in the MMSAG, allocating a group identification number to the MMSAG, associating a group data record with the group identification number, and storing in the group data record, a list of the individual subscriber identification numbers allocated to the plurality of mobile subscribers in the MMSAG. The method also includes implementing service logic for selecting one of the individual subscriber identification numbers to receive an incoming call to the group identification number, and storing a plurality of individual mobile subscriber records, each of which is identified by and linked to one of the individual subscriber identification numbers in the group data record list. Each of the individual mobile subscriber records is associated with a mobile subscriber, and stores mobile subscriber data for the associated mobile subscriber, and an identification of a serving Mobile Switching Center (MSC) currently serving the associated mobile subscriber.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention utilizes a Multiple Mobile Subscriber Access Group (MMSAG) number as a unique group identification number for a group of mobile subscribers. Each individual mobile subscriber also keeps an individual identification number such as its individual GSM directory number (MSISDN). Each mobile subscriber can place calls normally through their MSISDN, and receive calls either through their MSISDN or through the MMSAG number. When an incoming call is received in a Gateway Mobile Switching Center (G-MSC) for the group MMSAG number, routing information is requested from an associated Home Location Register (HLR). The HLR utilizes an access method in its service logic to select a single mobile subscriber from the MMSAG to receive the call. For any one call, if the called mobile subscriber does not answer or is not available to receive the call, the process of selecting a mobile subscriber to receive the call continues until all of the mobile subscribers in the MMSAG have been tried unsuccessfully. At that point, the call may be routed to a voice mail machine.

Figure 1:
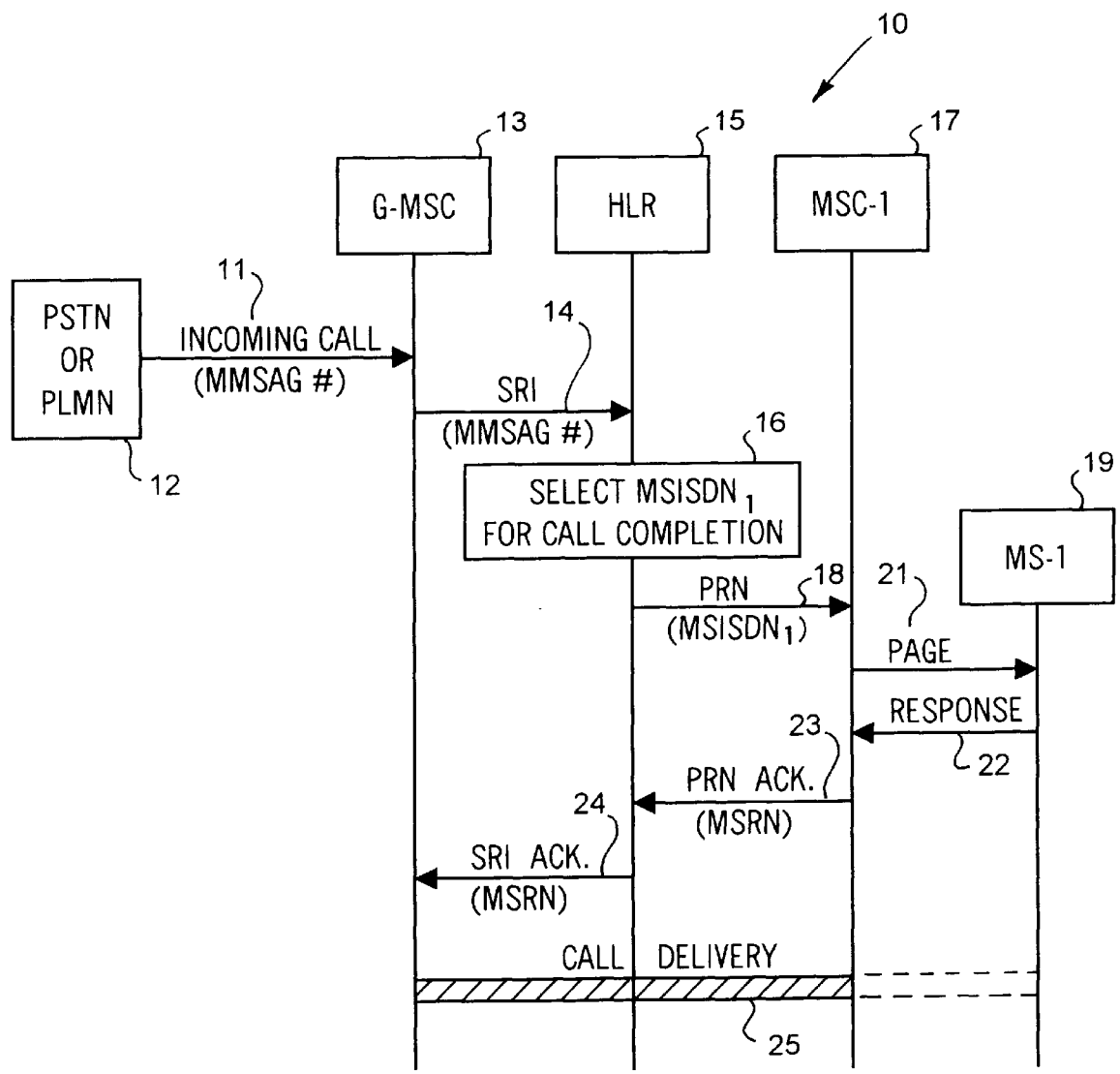
FIG. 1 is a message flow diagram illustrating the flow of messages in a GSM radio telecommunications network when connecting an incoming call to a called subscriber in a Multiple Mobile Subscriber Access Group (MMSAG) in accordance with the teachings of the present invention.

FIG. 1 is a message flow diagram illustrating the flow of messages in a GSM radio telecommunications network 10 when connecting an incoming call 11 to a called subscriber in a Multiple Mobile Subscriber Access Group (MMSAG) in accordance with the teachings of the present invention. Network signaling is conducted in accordance with GSM 09.02 Mobile Application Part (MAP), which is hereby incorporated by reference herein. The incoming call 11 may originate in any wireline network such as the Public Switched Telephone Network (PSTN) or in the Public Land Mobile Network (PLMN) 12. The dialed digits in the incoming call are for a Multiple Mobile Subscriber Access Group (MMSAG). The MMSAG includes a plurality of mobile subscribers, each having its own Mobile Subscriber Integrated Services Digital Network (MSISDN) identification number. The incoming call is received in a Gateway Mobile Switching Center (G-MSC) 13 which sends the MMSAG number in a Send Routing Information (SRI) message 14 to a Home Location Register (HLR) 15. The HLR recognizes that the dialed number is a MMSAG number, and retrieves an associated MMSAG data record. At 16, the HLR selects a MSISDN such as MSISDN$_1$ from the identified MMSAG data record for routing the call.

Each MSISDN in the MMSAG data record is linked to a mobile subscriber data record. From the mobile subscriber data record for the selected MSISDN$_1$, a serving mobile switching center (MSC-1) 17 is identified. The HLR 15 then forwards the selected MSISDN1 to MSC-1 in a Provide Roaming Number (PRN) message 18. The MSC-1 then determines the availability of the called mobile subscriber (MS-1) 19 by paging for the MS-1 at 21. If a page response is received at 22, the MSC-1 sends an PRN acknowledgement message 23 to the HLR and includes a Mobile Subscriber Roaming Number (MSRN). The HLR sends an SRI acknowledgement message 24 to the G-MSC and includes the MSRN. The G-MSC then completes call delivery at 25 to the serving MSC-1 which completes the call to the MS-1.

Figure 2:
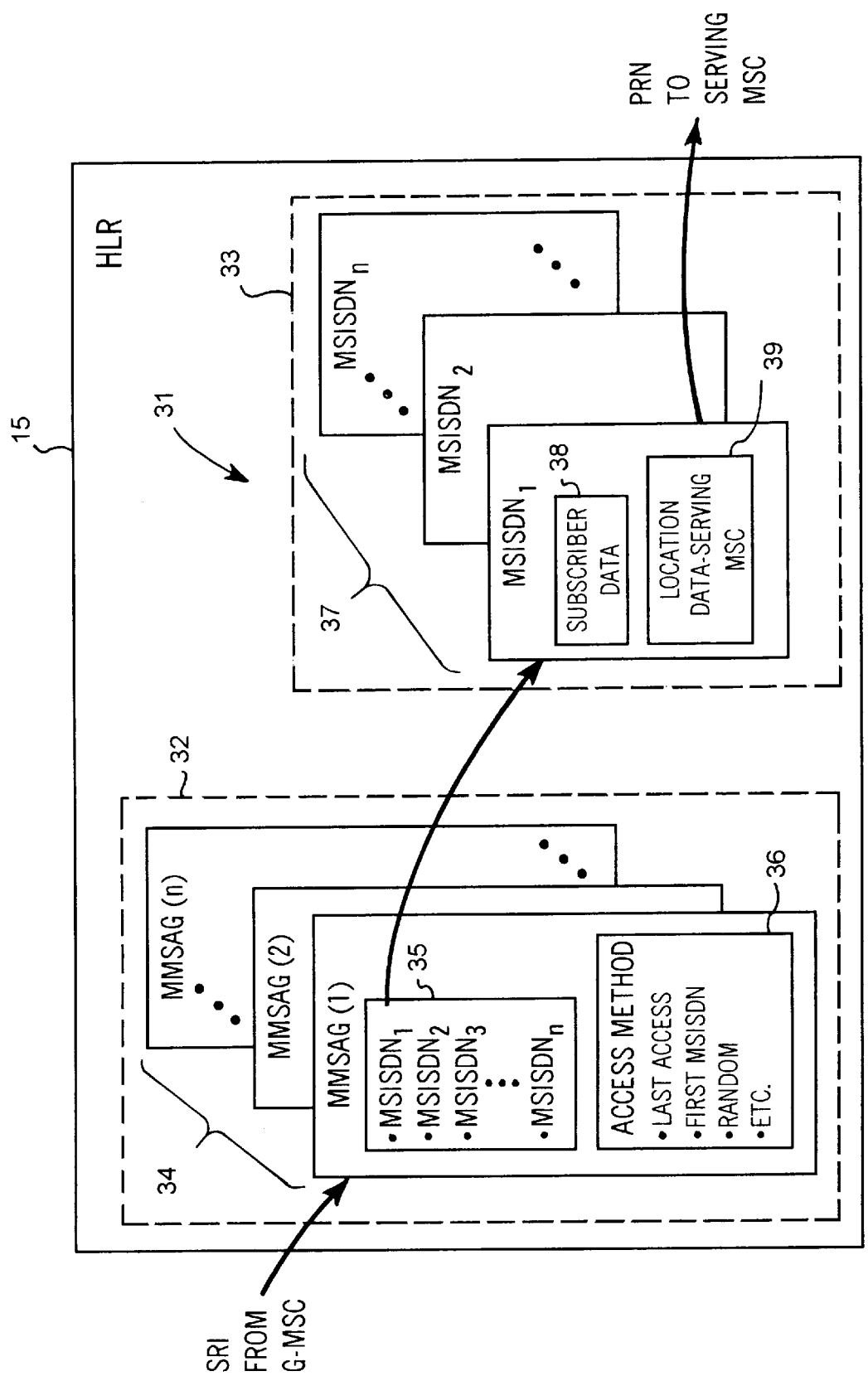
FIG. 2 is an illustrative drawing of a data structure implemented within a Home Location Register (HLR) in the preferred embodiment of the present invention.

Referring to FIG. 2, there is shown an illustrative drawing of a data structure 31 implemented within the HLR 15 in the preferred embodiment of the present invention. The data structure is utilized by the HLR to identify a MMSAG data record corresponding to the received MMSAG number, to select from the identified MMSAG data record, a MSISDN to which the call is to be routed, and to identify the serving MSC for the selected MSISDN. The data structure includes a MMSAG data structure 32 and a MSISDN data structure 33. The MMSAG data structure 32 may include one or more MMSAG data records 34, each of which contains a list of MSISDNs 35 which belong to the particular MMSAG, and service logic 36 for selecting one of the group's MSISDNs for completion of the call. The selection may be made in any manner desired by the creator of the MMSAG record. For example, the selection may be made to the next sequential MSISDN following the MSISDN selected on the last access. A record of which mobile subscriber from the MMSAG was called on the last access is kept in the HLR. Alternatively, the first MSISDN in the group may always be selected first, or the selection may be made randomly. Other methods such as geographic location, time of day, etc. may also be utilized and are within the scope of the present invention. The nature of the MMSAG generally determines the type of access method utilized.

The MSISDN data structure 33 includes a plurality of individual MSISDN data records 37. Each MSISDN record includes subscriber data 38 and location data 39 including the currently serving MSC.

With reference to FIGS. 1 and 2, the SRI message 14 from the G-MSC 13 includes the MMSAG number which identifies one of the MMSAG records, for example, MMSAG (1). Utilizing the access method specified for MMSAG(1), the HLR selects one of the MSISDNs, for example MSISDN$_1$. The MSISDN$_1$ listing in the MMSAG(1) record is linked to a corresponding MSISDN record 37 in the MSISDN data structure 33. The HLR retrieves required location data from the MSISDN$_1$ record and sends the PRN message 18 to the serving MSC- 1 and includes the MSISDN$_1$.

Figure 3:
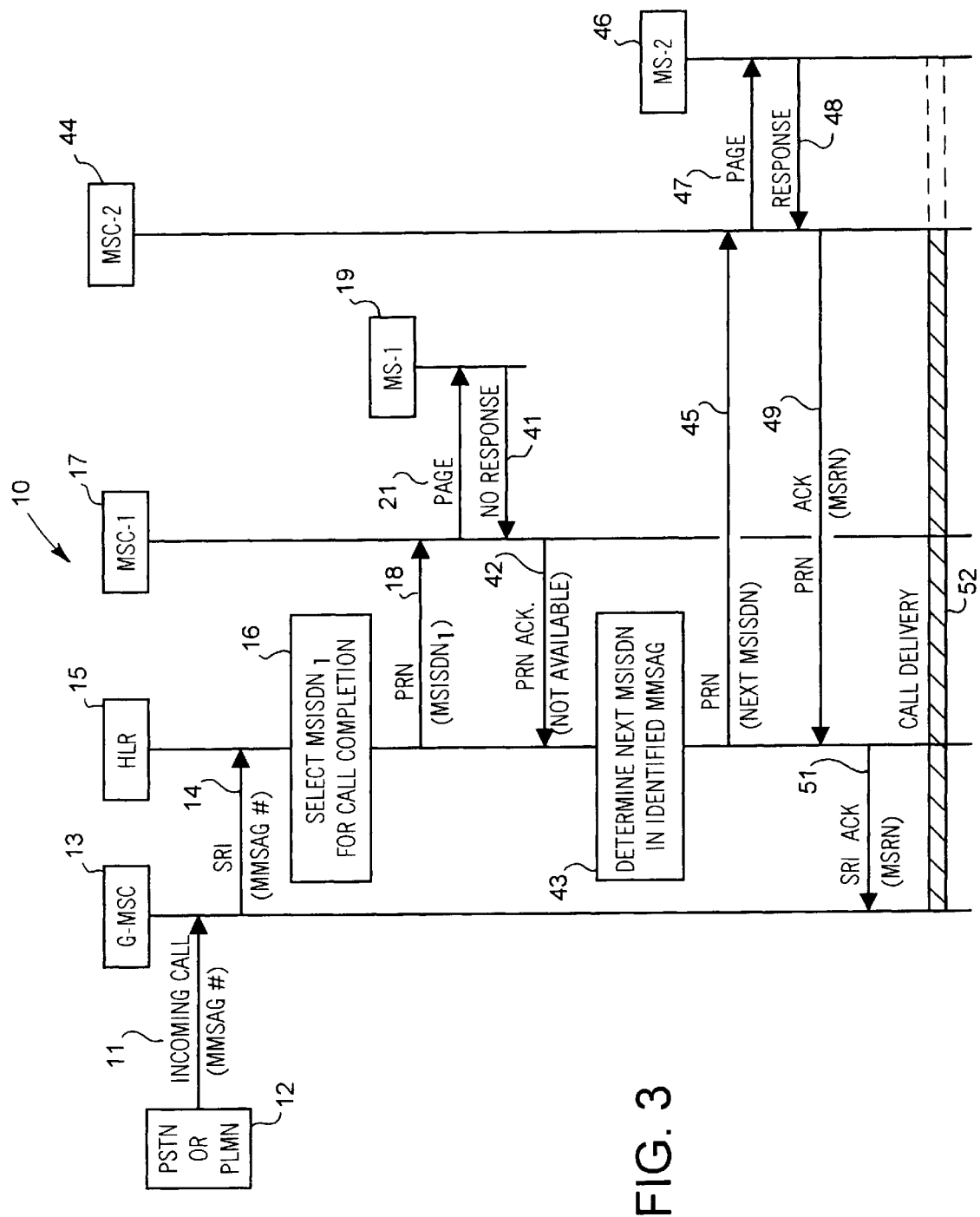
FIG. 3 is a message flow diagram illustrating the flow of messages in a GSM radio telecommunications network 10 when connecting an incoming call 11 to a called subscriber in a Multiple Mobile Subscriber Access Group (MMSAG) when the first called subscriber is not available.

FIG. 3 is a message flow diagram illustrating the flow of messages in a GSM radio telecommunications network 10 when connecting an incoming call 11 to a called subscriber in a Multiple Mobile Subscriber Access Group (MMSAG) when the first called subscriber is not available. The message flow is identical to that of FIG. 1 through the attempted page 21 by the serving MSC-1 (17). In the scenario depicted in FIG. 3, the mobile subscriber 19 either does not respond to the page at 41, or the MSC-1 determines that the mobile subscriber is currently busy. The MSC-1 then sends a PRN acknowledgement message 42 to the HLR 15 and includes an indication that the MS-1 is not available to receive the call. At 43, the HLR then utilizes the access method service logic 36 (FIG. 2) to determine the next MSISDN on the MSISDN list 35 in the identified MMSAG. The serving MSC is then identified for the next MSISDN. In the example of FIG. 3, the next MSISDN is currently being served by MSC-2 (44). Therefore, the HLR sends a PRN message 45 to the MSC-2 and includes the next MSISDN.

The MSC-2 then determines the availability of the called mobile subscriber (MS-2) 46 by paging for the MS-2 at 47.

If a page response is received at 48, the MSC-2 sends an PRN acknowledgement message 49 to the HLR and includes the MSRN for MS-2. The HLR sends an SRI acknowledgement message 51 to the G-MSC 13 and includes the MSRN. The G-MSC then completes call delivery at 52 to the serving MSC-2 which completes the call to the MS-2.

The situation may occur in which multiple MSISDNs are selected, and the corresponding mobile subscribers are not available to take the call. In this case, the HLR continues to select the next MSISDN in the MMSAG in accordance with the access method logic 36, and continues to forward the MSISDNs to their currently serving MSC until either an available mobile subscriber is found (and the call delivered) or the MSISDN list 35 is exhausted. If no available mobile subscriber is found, the call may be forwarded to a voice mail machine.

Figure 4:
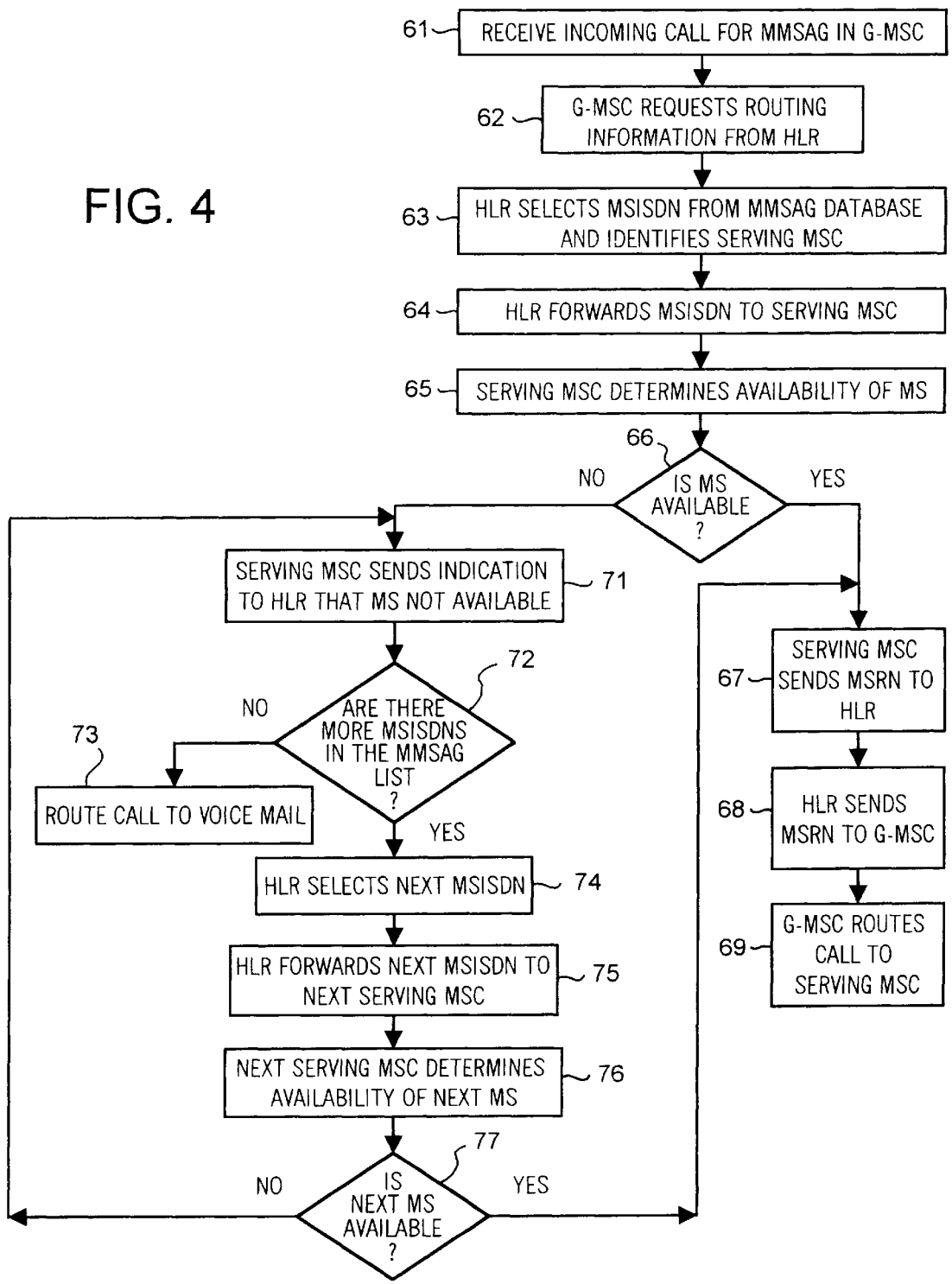
FIG. 4 is a flow chart of the steps of the method of the present invention.

FIG. 4 is a flow chart of the steps of the method of the present invention. Referring to FIGS. 2, 3, and 4, the method will now be described. At step 61, an incoming call for a MMSAG is received in the G-MSC 13. At 62, the G-MSC requests routing information from the HLR 15. The HLR recognizes that the dialed number is a MMSAG number, and at 63, selects a MSISDN from the MMSAG database 32 and identifies a serving MSC from the corresponding MSISDN data record. At 64, the HLR 15 forwards the selected MSISDN to the serving MSC. The serving MSC then determines the availability of the called mobile subscriber at 65. At step 66 it is determined whether or not the called mobile subscriber is available to receive the call. If the called mobile subscriber is available, the serving MSC sends the MSRN to the HLR. The HLR sends the MSRN to the G-MSC at 68, and the G-MSC then routes the call to the serving MSC at 69 which completes the call to the mobile subscriber.

If, however, it is determined at step 66 that the called mobile subscriber is not available to receive the call, the method moves to step 71 where the serving MSC sends an indication to the HLR that the mobile subscriber is not available to receive the call. At step 72, the HLR determines whether or not there are additional MSISDNs in the MMSAG's list of MSISDNs 35. If not, the method moves to step 73 where the call is routed to a voice mail machine. However, if there are additional MSISDNs in the MMSAG's list, the method moves to step 74 where the HLR then utilizes the access method service logic 36 to determine and select the next MSISDN on the MSISDN list. At 75, the HLR forwards the next MSISDN to the next serving MSC which is currently serving that MSISDN.

The next serving MSC then determines the availability of the next mobile subscriber at 76. At 77, it is determined whether or not the next mobile subscriber is available to receive the call. If the next mobile subscriber is available, the method returns to step 67 where the serving MSC sends the MSRN to the HLR. The HLR sends the MSRN to the G-MSC at 68, and the G-MSC then routes the call to the serving MSC at 69 which completes the call to the mobile subscriber.

If, however, it is determined at step 77 that the next mobile subscriber is not available to receive the call, the method returns to step 71 where the serving MSC sends an indication to the HLR that the mobile subscriber is not available to receive the call. The HLR continues to select the next MSISDN in the MMSAG in accordance with the access method logic 36, and continues to forward the MSISDNs to their currently serving MSC until either an available mobile subscriber is found (and the call delivered) or the MSISDN list 35 is exhausted, and the call is routed to voice mail.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A home location register (HLR) in a radio telecommunications network comprising:
   a connection to a Gateway Mobile Switching Center (G-MSC) for receiving a request for routing information from the G-MSC and for returning a routing number to the G-MSC, said request for routing information including a group identification number for a Multiple Mobile Subscriber Access Group (MSAG) which includes a plurality of mobile subscribers;
   a first data structure comprising:
      a group data record associated with the group identification number for the MMSAG, said group data record including:
         a list of individual subscriber identification numbers allocated to the plurality of mobile subscribers assigned to the MMSAG; and
         service logic for selecting one of the individual subscriber identification numbers to receive an incoming call to the group identification number, said service logic recording the last individual mobile subscriber number to receive an incoming call and selecting the next sequential individual mobile subscriber number following the recorded last number to receive an incoming call; and
   a second data structure linked to the first data structure comprising:
      a plurality of individual mobile subscriber records, each of which is identified by one of the individual subscriber identification numbers in the group data record list and each of which is associated with a mobile subscriber, and each individual mobile subscriber record including:
         mobile subscriber data for the associated mobile subscriber; and
         an identification of a serving Mobile Switching Center (MSC) currently serving the associated mobile subscriber; and
   a connection to the serving MSC for sending a request for a routing number to the serving MSC, for receiving a routing number from the serving MSC if the selected subscriber is available, and for receiving an indication that the selected subscriber is not available if the selected subscriber is not available.

2. A method in a radio telecommunications network of connecting an incoming call to a called subscriber in a Multiple Mobile Subscriber Access Group (MMSAG which includes a plurality of mobile subscribers, said method comprising the steps of:
   receiving the incoming call in a Gateway Mobile Switching Center (G-MSC) in the network, the incoming call including a group identification number for the MMSAG;
   sending a request for routing information from the G-MSC to a Home Location Register (HLR);
   accessing in the HLR, a group data record associated with the group identification number, said group data record including a list of individual mobile subscriber numbers allocated to the mobile subscribers in the MMSAG;

selecting with service logic in the HLR, a first one of the individual mobile subscriber numbers to receive the call, said selecting step including the steps of:

recording the last individual mobile subscriber number to receive an incoming call; and selecting the next sequential individual mobile subscriber number following the recorded last number to receive an incoming call;

determining whether a first mobile subscriber associated with the first selected individual mobile subscriber number is available to receive the call; and completing the call to the first mobile subscriber associated with the first selected individual mobile subscriber number upon determining that the first mobile subscriber is available to receive the call.

3. The method in a radio telecommunications network of connecting an incoming call to a called subscriber in a MMSAG of claim 2 wherein the step of selecting a first one of the individual mobile subscriber numbers to receive the call includes selecting the first individual mobile subscriber number on the list of individual mobile subscriber numbers allocated to the mobile subscribers in the MMSAG.

4. The method in a radio telecommunications network of connecting an incoming call to a called subscriber in a MMSAG of claim 2 wherein the step of determining whether a first mobile subscriber associated with the first selected individual mobile subscriber number is available to receive the call includes the steps of:

sending a request for a roamer number for the first mobile subscriber to a serving MSC currently serving the first mobile subscriber;

paging the mobile subscriber in the serving MSC;

determining whether a page response is received from the first mobile subscriber;

returning a roamer number for the first mobile subscriber to the HLR upon determining that a page response is received from the first mobile subscriber; and returning an indication that the first mobile subscriber is not available to the HLR upon determining that a page response is not received from the first mobile subscriber.

5. The method in a radio telecommunications network of connecting an incoming call to a called subscriber in a MMSAG of claim 2 wherein the step of determining whether a first mobile subscriber associated with the first selected individual mobile subscriber number is available to receive the call includes the steps of:

sending a request for a roamer number for the first mobile subscriber to a serving MSC currently serving the first mobile subscriber;

determining in the serving MSC that the first mobile subscriber is currently busy; and returning an indication to the HLR that the first mobile subscriber is not available.

6. The method in a radio telecommunications network of connecting an incoming call to a called subscriber in a MMSAG of claim 2 further comprising the steps of:

selecting a next one of the individual mobile subscriber numbers to receive the call upon determining that the first mobile subscriber is not available to receive the call;

determining whether a next mobile subscriber associated with the next selected individual mobile subscriber number is available to receive the call; and completing the call to the next mobile subscriber associated with the next selected individual mobile subscriber number upon determining that the next mobile subscriber is available to receive the call.

7. The method in a radio telecommunications network of connecting an incoming call to a called subscriber in a MMSAG of claim 6 further comprising, before the step of selecting a next one of the individual mobile subscriber numbers to receive the call, the steps of:

determining whether all of the plurality of mobile subscribers in the MMSAG have been found to be unavailable; and forwarding the call to a voice mail machine upon determining that all of the plurality of mobile subscribers in the MMSAG have been found to be unavailable.

8. In a Home Location Register (HLR) in a radio telecommunications network, a method of selecting a called subscriber to receive an incoming call, said called subscriber belonging to a Multiple Mobile Subscriber Access Group (MMSAG) which includes a plurality of mobile subscribers, said method comprising the steps of:

receiving a request for routing information from a Gateway Mobile Switching Center (G-MSC) in the network, the request for routing information including a group identification number for the MMSAG;

accessing a group data record associated with the group identification number, said group data record including a list of individual mobile subscriber numbers allocated to the mobile subscribers in the MMSAG;

selecting with service logic, a first one of the individual mobile subscriber numbers to receive the call, said selecting step including the steps of:

recording the last individual mobile subscriber number to receive an incoming call; and selecting the next sequential individual mobile subscriber number following the recorded last number to receive an incoming call;

determining a serving MSC for the first selected subscriber number;

sending a request for a routing number to the serving MSC;

receiving a routing number from the serving MSC if a first mobile subscriber associated with the first selected individual mobile subscriber number is available to receive the call;

receiving a non-availability indication if the first mobile subscriber is not available; and sending the routing number to the G-MSC for completion of the call to the first mobile subscriber if the first mobile subscriber is available to receive the call.

* * * * *